United States Patent [19]
Gulick et al.

[11] Patent Number: 5,404,459
[45] Date of Patent: Apr. 4, 1995

[54] SERIAL INTERFACE MODULE AND METHOD IN WHICH THE CLOCK IS ONLY ACTIVATED TO SEND A PREDETERMINED NUMBER OF DATA BITS

[75] Inventors: Dale E. Gulick; Alan F. Hendrickson, both of Austin, Tex.; Munehiro Yoshikawa, Tokyo, Japan; Hiroshi Matsubara, Tokyo, Japan; Kazushige Tsurumi, Tokyo, Japan

[73] Assignees: Advanced Micro Devices, Sunnyvale, Calif.; Sony Corporation, Tokyo, Japan

[21] Appl. No.: 918,624

[22] Filed: Jul. 21, 1992

[51] Int. Cl.6 .................... G06F 1/04; G06F 1/32
[52] U.S. Cl. .................... 395/275; 395/550; 364/927.99; 364/927.92; 364/DIG. 2
[58] Field of Search .................... 395/275, 550

[56] References Cited

U.S. PATENT DOCUMENTS

| | | | |
|---|---|---|---|
| 4,435,761 | 3/1984 | Kimoto | 364/200 |
| 4,473,879 | 9/1984 | Tachiuchi et al. | 364/200 |
| 4,545,030 | 10/1985 | Kitchin | 364/900 |
| 4,642,791 | 2/1987 | Mallozzi et al. | 364/900 |
| 4,698,748 | 10/1987 | Juzswick et al. | 395/750 |
| 4,851,987 | 7/1989 | Day | 395/550 |
| 5,083,266 | 1/1992 | Watanabe | 395/275 |
| 5,218,704 | 6/1993 | Watts, Jr. et al. | 395/750 |
| 5,254,888 | 10/1993 | Lee et al. | 307/480 |

Primary Examiner—Robert L. Richardson
Assistant Examiner—Fran R. Faller
Attorney, Agent, or Firm—Johnson & Wortley

[57] ABSTRACT

A serial communication port structure for starting and stopping an internal clock. This internal clock is designed, in operation, to generate a clock output signal to be transmitted to a device external to the system in which the serial communication port is incorporated. By ANDing the clock output signal with a data output signal of predetermined length, the serial communication port can effectively control the passage of time as sensed by the external device.

19 Claims, 6 Drawing Sheets

| 7 | 6 | 5 | 4 | 3 | 2 | 1 | 0 |
|---|---|---|---|---|---|---|---|
| RESERVED | RESERVED | RESERVED | RESERVED | CLOCK LEVEL SELECT | RX CLOCK EDGE | RX WORD LENGTH | READ/ WRITE |

FIG. 6

| 7 | 6 | 5 | 4 | 3 | 2 | 1 | 0 |
|---|---|---|---|---|---|---|---|
| TX BIT 7 (MSB) | TX BIT 6 | TX BIT 5 | TX BIT 4 | TX BIT 3 | TX BIT 2 | TX BIT 1 | TX BIT 0 (LSB) |

FIG. 7

| 7 | 6 | 5 | 4 | 3 | 2 | 1 | 0 |
|---|---|---|---|---|---|---|---|
| RX BIT 7 (MSB) | RX BIT 6 | RX BIT 5 | RX BIT 4 | RX BIT 3 | RX BIT 2 | RX BIT 1 | RX BIT 0 (LSB) |

| 7 | 6 | 5 | 4 | 3 | 2 | 1 | 0 |
|---|---|---|---|---|---|---|---|
| RESERVED | RESERVED | RESERVED | RESERVED | RESERVED | TX LENGTH BIT 2 | TX LENGTH BIT 1 | TX LENGTH BIT 0 |

FIG. 9

| 7 | 6 | 5 | 4 | 3 | 2 | 1 | 0 |
|---|---|---|---|---|---|---|---|
| RESERVED | RESERVED | RESERVED | RESERVED | RESERVED | RESERVED | SI/O TX BUFFER EMPTY | SI/O RX BUFFER FULL |

FIG. 10

| 7 | 6 | 5 | 4 | 3 | 2 | 1 | 0 |
|---|---|---|---|---|---|---|---|
| RESERVED | RESERVED | RESERVED | RESERVED | RESERVED | RESERVED | SI/O TX BUFFER EMPTY | SI/O RX BUFFER FULL |

FIG. 11

| 7 | 6 | 5 | 4 | 3 | 2 | 1 | 0 |
|---|---|---|---|---|---|---|---|
| RESERVED | RESERVED | RESERVED | RESERVED | RESERVED | RESERVED | SI/O TX BUFFER EMPTY | SI/O RX BUFFER FULL |

SERIAL INTERFACE MODULE AND METHOD IN WHICH THE CLOCK IS ONLY ACTIVATED TO SEND A PREDETERMINED NUMBER OF DATA BITS

CROSS-REFERENCE TO RELATED APPLICATIONS

This application is related to the following U.S. Patent Applications:

| SER. NO. | TITLE | INVENTOR(S) |
|---|---|---|
| 07/917,497 pending | General I/O Port Interrupt Mechanism | Gulick, et al. |
| 07/917,489 pending | Improved External Memory Access Control for a Processing Unit | Gulick, et al. |
| 07/917,488 now adandoned | Method of Weak Pull-up Disable and Mechanism Therefor for Use with Microcontroller in Integrated Circuit and Cordless Telephone Using the Integrated Circuit | Bowles, et al. |
| 07/917,503 now abandoned | Interrupt Mask Disable Circuit and Method | Bowles, et al. |
| 07/918,627 pending | Integrated Circuit and Cordless Telephone Using the Integrated Circuit | Gulick, et al. |
| 07/918,626 pending | Modulator Test System | Peterson, et al. |
| 07/918,625 pending | Keypad Scanner Process and Device and Cordless Telephone Employing the Mechanism | Gulick |
| 07/918,631 no abandoned | Low Power Emergency Telephone Mode | Peterson, et al. |
| 07/918,632 pending | In-Circuit Emulation Capability Mode in Integrated Circuit and Cordless Telephone Using the Integrated Circuit | Gulick, et al. |
| 07/918,622 abandoned | Clock Generator Capable of Shut-down Mode and Clock Generation Method | Peterson, et al. |
| 07/918,621 pending | Signal Averager | Gulick |

All of the related applications are filed on even date herewith, are assigned to the assignee of the present invention, and are hereby incorporated herein in their entirety by this reference thereto.

BACKGROUND OF THE INVENTION

1. Field of the Invention

The present invention relates to systems for communicating between microcontrollers and other devices and, more particularly, to systems implementing a serial interface for communicating between an on-chip microcontroller and external devices.

DESCRIPTION OF RELATED ART

Both serial and parallel interfaces are well known to those skilled in the art. Serial interfaces involve time-sequential processing of the individual parts as a whole, such as the bits of a character, the characters of a word, and so on, using the same facilities for successive parts. Parallel interfaces, on the other hand, involve the simultaneous processing of the individual parts of a whole, using separate facilities for the various parts.

The present invention relates to serial interfaces such as those than can allow an on-chip microcontroller to talk to a number of industry standard external devices, such as serial electrically erasable/programmable read-only memories (EEPROM's). Traditionally, such interfaces have been formed relying heavily upon software to control the ports of the microcontroller. Some efforts have been made to construct serial interfaces with dedicated hardware; however, these efforts have not produced a simple, low-cost, and flexible alternative to software-intensive serial interfaces.

Based upon the foregoing, it is clear that it has been a shortcoming and deficiency of the prior art that no one has developed a simple, low-cost, and flexible interface module for an integrated circuit (IC), which interface is made primarily of hardware, and which interface allows serial communication between on-chip microcontrollers and receptive external devices.

SUMMARY OF THE INVENTION

To overcome the shortcoming and deficiency of the prior art mentioned above, the present invention provides a serial communication system including a serial communication port structure for starting and stopping an internal clock. This internal clock is designed, in operation, to generate a clock output signal to be transmitted to a device external to the system in which the serial communication port is incorporated. By ANDing the clock output signal with a data output signal of predetermined length, the serial communication port can effectively control the passage of time as sensed by the external device.

Therefore, the present invention may be understood to provide a serial input/output port for a microcontroller, which serial input/output port is operable to send data and clock signals to an external device. The serial input/output port provided by the present invention includes means for determining a select number of data bits to send to the external device, means for producing only enough clock pulses to send the determined select number of data bits, means for beginning production of clock pulses to send the determined select number of data bits, and means for stopping production of clock pulses immediately upon production of only enough clock pulses to send the determined select number of data bits.

The present invention also provides a serial input/output port module for a microcontroller, which serial input/output port modules is operable to send data and clock signals to an external device. According to the teachings of the present invention this serial input/output port module includes an internal clock, means for starting the internal clock, means for transmitting a predetermined number of data bits to the external device while the clock is running, and means for stopping the internal clock immediately upon completion of transmission of the predetermined number of bits.

Still further, the present invention provides a method for transmitting data from a microcontroller to an external device over a serial input/output port. The method provided by the present invention includes the steps of sending a predetermined amount of the data simultaneously with a clock signal to the external device, and stopping the clock signal immediately upon transmission of the last of the predetermined amount of data.

Accordingly, it is an object of the present invention to provide a simple, low-cost, and flexible serial interface.

Another object of the present invention is to provide an interface module for an IC made primarily of hardware and which allows serial communication between on-chip microcontrollers and receptive external devices.

BRIEF DESCRIPTION OF THE DRAWINGS

For a more complete understanding of the present invention, and for further objects and advantages thereof, reference may now be had to the following detailed description taken in conjunction with the accompanying drawings wherein.

DETAILED DESCRIPTION OF THE INVENTION

To facilitate understanding of the present invention, it will be described herein in the form of a module performing system control functions in a microcontroller system. A particular application, involving cordless telephones, will also be described. Such a discussion is particularly advantageous because an embodiment of the present invention like that described has been actually constructed and used with outstanding results. It should be kept in mind, however, that the invention described herein is not limited to cordless telephone applications. To the contrary, embodiments of the present invention may be employed in virtually any application requiring or improved by having a serial interface. The particular embodiments of the present invention described herein are exemplary only.

Figure 1:
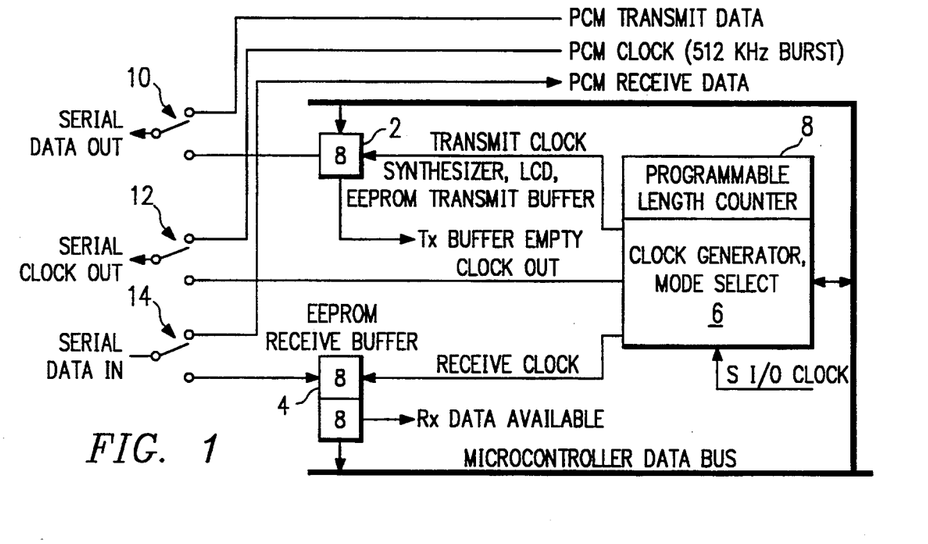
FIG. 1 is a block diagram of a serial interface according to the teachings of the present invention.

Referring now to FIG. 1, there is shown a block diagram of a serial interface. This particular serial interface is a combination of four serial channels designed to provide communication with frequency synthesizers (such as the Fujitsu MB1501 Frequency Synthesizer), an LCD controller (such as the NEC microPD7225 LCD Controller), an EEPROM (such as a S-2914AR/1 EEPROM), and PCM codec test equipment. In the embodiment of the present invention shown in FIG. 1, a common set of transmit, receive, and clock logic is used to support the synthesizer, LCD, EEPROM, and PCM interfaces. Hereinafter, this combined set of hardware is referred to as the serial I/O or SI/O interface.

Before describing the SI/O hardware used to implement the various requirements placed upon it, the operational requirements placed upon the SI/O interface by the various external devices it is required to communicate with will be discussed. These operational requirements arise based upon the synthesizer interface, the LCD interface, the EEPROM interface, and the PCM test port interface. Each interface is discussed immediately below. Additionally, exception conditions and test cases for the actually constructed and used embodiment of the present invention are also discussed.

With respect to the synthesizer interface, it should be understood that communication between the IC and the synthesizer chip is unidirectional, from the IC to the synthesizer. Three interface signals, Tx Data, Shift Clock, and Synthesizer Latch, are required. The Tx Data signal is for serial data output. In actual operation, data is transmitted MSB first, on the falling edge of the clock. For the Shift Clock signal a 50% duty cycle clock can be used. This allows programmable speed, e.g., 288 kbps, 144 kbps, 72 kbps, and 36 kbps. In actual operation, the clock is gated on only when data is being sent, and is held high the rest of the time that the module is enabled. With regard to the Synthesizer Latch signal, a "latch" pulse is sent on a dedicated pin after the last bit has been sent. In the actually constructed embodiment of the present invention, this function is supported with a general purpose parallel port pin.

With regard to the LCD interface, a serial interface is provided for communicating between an on-chip microcontroller and an LCD controller IC. Like the synthesizer interface, this interface is unidirectional, from the IC to the LCD controller. Five interface signals are supported over this interface. A Tx Data signal is used to transmit serial data output in 8-bit words, MSB first. The four other signals are a Shift clock, a Chip Select, a Command/Data, and a Busy signal. With respect to the Shift Clock signal, in the actually constructed embodiment of the present invention, data is transmitted synchronous to the falling edge of a 50% duty cycle clock (received into the LCD controller on the rising edge, with a one microsecond setup and hold time). Clock speed is programmable with 288 kbps, 144 kbps, 72 kbps, and 36 kbps being selectable. The clock is gated on only when data is being sent, with eight cycles being output for each byte of data sent. The clock is held high when data is not being sent. The Chip Select pin is a software controlled port pin. An active low output on this pin indicates that the data on the Tx Data output pin is intended for the LCD controller. The Command/Data and Busy pins are also software controlled. The Command/Data pin provides an address line to the LCD controller. The Busy pin is used in conjunction with the LCD controller generating a busy strobe to indicate that the LCD controller is free to receive the next data byte.

The EEPROM interface in the actually constructed embodiment of the present invention is bidirectional, and is compatible with 8- and 16-bit devices that support the National, General Instruments, and Exel interface. Additionally, support for devices that output data on the falling edge of the clock is provided. Thus, for compatibility with a wide variety of devices, the port can be programmed to receive data on the rising or falling edge. Four interface pins, a Tx Data, an Rx Data, a Shift Clock, and a Chip Select, are supported. The Tx Data pin is for serial data output. In the actually constructed embodiment of the present invention data is transmitted MSB first, on the falling edge of the clock. The word length is from 5 to 28 bits long. Words longer than eight bits can be transmitted in two or more increments. For example, an eleven bit word can be transmitted as one byte followed by 3 bits, a 7-bit and a 4-bit word, or even 11 1-bit words. The Rx Data pin is for serial data input, which in the system described herein means 8- or 16-bit words, MSB first. When data is received on the rising edge of the clock, the first data bit is received on the first rising edge of the clock after the end of the last transmit bit time, one and one half clock cycles after the falling edge that output the last bit. When data is received on the falling edge, the first data bit is received on the second edge after the falling edge that output the last transmitted bit. In such a case, the "dummy" bit is not received. With respect to the Shift Clock pin, in the actually constructed embodiment of the present invention data is transmitted synchronous to the falling edge of a 50% duty cycle clock. When multiple byte words are transmitted, the clock output is held high between transmission of parts of the same word. Data is received from the EEPROM on either the rising or falling edge of this same clock. Clock speed is programmable, with 288 kbps, 144 kbps, 72 kbps, and 36 kbps being possible selections. For write operations, the clock is active only when data is being transmitted. It is held high when stopped. For read operations, the clock continues to run after the transmit part of the sequence until either 8 or 16 bits are received as specified in the SI/O mode register, discussed further below. The Chip Select pin is a software controlled port pin, whereupon an active low output indicates that the EEPROM is being accessed.

Now, with regard to the PCM test port interface, in the actually constructed embodiment of the present invention, two special modes can be invoked from software that convert the serial port to a codec or an ADPCM transcoder test port. In a codec test mode, the Data In pin becomes the 64 kbps transmit output, and the Clock pin becomes a gated 512 kHz PCM data clock output, i.e., bursts of eight cycles at an 8 kHz frame rate. In ADPCM test mode the Data In pin becomes the 64 kbps ADPCM transmit input (or PCM data input), the Data Out pin becomes the 64 kbps ADPCM receive output (or PCM data output), and the Clock pin becomes the 512 kHz PCM data clock output, i.e., eight bit bursts at the 8 kHz frame rate. The B/D channel port provides the 8 kHz frame sync clock. The 64 kHz data clock must be synchronized to the 8 kHz frame sync.

Further with respect to the PCM test port interface, the PCM test port does not use the serial I/O port's transmit buffer, receive buffer, or clock generator. The audio path logic provides the clock and a serial transmit bit stream, and receives the receive data in serial form. In other words, the PCM test function uses the serial I/O port pins, but the logic to support clock operation, clock synchronization, serial to parallel, and parallel conversion is handled within the audio path logic.

As additional general matters with regard to the embodiment of the present invention shown in FIG. 1, as mentioned previously, note may be made of exception conditions, and also of test cases.

With regard to exception conditions, if software sends a read command to an EEPROM, but fails to set the read bit in the serial port mode register, the EEPROM will attempt to complete the read operation the next time the serial port clock is active, and the EEPROM's chip select is active. In embodiments of the present invention, the receiver may ignore any data returned at this time.

Some seven matters may be verified by test cases in embodiments of the present invention. First, transmission may be verified of each of the target SI/O external devices including correct number of clocks for 1 to 8 bits sent, clock stops in correct state, proper set-up time is met when transmission and clocks restart, and proper handling of dummy bit for both rising and falling edge reception. Second, it may be verified that clocks are turned off in the proper state when the interface is disabled. Further, buffer status reporting for SI/O receive and transmit buffers may be verified, and it may be verified that SI/O data is not received at the wrong time. PCM mode operation, including pin multiplexing, may also be verified. Interrupt status reporting, including asynchronous read of double buffered receive buffers, may also be verified. Finally, all register defaults may be verified.

Referring again to FIG. 1, the embodiment of the present invention shown therein may be seen to comprise a transmit buffer 2, a receive buffer 4, a clock generator 6, a programmable length counter 8, and a mode register (also designated by reference numeral 6). Each of these elements is discussed immediately below.

Regarding the transmit buffer shift register 2, it may be seen in FIG. 1 that an 8-bit long transmit shift register forms part of embodiments of the present invention. In the illustrated embodiment, this register 2 is loaded by software with from 1 to 8 bits of data. The number of bits actually loaded corresponds to the number of bits programmed in the SI/O transmit length register. Data is transmitted MSB first with data bus bit 7 loading the MSB of the shift register. When less than 8 bits are loaded, software locates the bits to be transmitted in the least significant bit positions of the shift register. Transmission begins when the buffer is written if a reception is not in progress, otherwise transmission starts automatically after the read operation is completed.

In the illustrated embodiment of the present invention, software only loads data into the buffer when transmission is not in progress. No error indication is generated if the microcontroller attempts to write to the buffer during transmission. Data is shifted out of the buffer on the falling edge of the shift clock. The output pin is held high when the SI/O interface is enabled and data is not being transmitted. Software transmits a "dummy" low bit if a high start bit is required by the receiving device.

Also in the illustrated embodiment of the present invention, a status bit is set in the SI/O status register whenever the transmit shift register is empty. The status bit is cleared when there is data in the shift register. A maskable interrupt is generated whenever this bit is set. Under normal conditions, the software will only enable the interrupt when data has been loaded into the shift register 2 and when there is more than one word to be transmitted. This causes an interrupt to be generated as soon as the last bit has left the shift register, at the end of the last bit time, indicating that a new word can be loaded.

In the actually constructed embodiment of the present invention, the number of bits to be transmitted, which is from 1–8 bits, is specified in the SI/O transmit length register.

The receive buffer 4 is a single-byte double-buffered register, where data is shifted serially into one half of the buffer pair, and is then automatically transferred into the second half if it is empty. This allows for a double buffer in the case of 8-bit wide EEPROMs, and single buffering when 16-bit wide EEPROMs are used. Data is read from the second half of the buffer pair by the microcontroller.

Data can programmably be received on the rising or falling edge of the clock. If data is received on the rising edge of the clock, the first bit is received on the second rising edge after the falling edge that outputs the last transmit bit, i.e., 1.5 cycles. If data is received on the falling edge, data is received on the second falling edge after the edge that output the last transmit bit, i.e., two cycles.

A status bit is set in the SI/O status register whenever there is at least one byte of data in the buffer. The bit is cleared when the register is empty. A maskable interrupt is generated whenever the bit is set.

Continuing to refer to FIG. 1, and more specifically to the clock generator 6, the clock generator 6 produces the correct clock output for each of the modes of operation. The master input clock to the SI/O clock generator 6 comes from the clock generator module (see FIG. 2a). The data rate is programmed in the serial port timing control register located in the clock generator module. Possible data rates include 288 kHz, 144 kHz, 72 kHz, and 36 kHz. The input clock is present only when the serial port is enabled, and is held low when the serial port module is disabled. The SI/O clock out pin is held low when the serial port is disabled or when the IC is in reset. When active, the output wave form and number of cycles is dependent on the mode of the serial port, as discussed immediately below.

Regarding the transmit mode, the clock output is the output of the clock divider ANDed with a control signal from the transmit length counter such that only the desired number of clock pulses are produced for each word to be transmitted. When multiple byte words are transmitted, the clock output is tied between transmission of parts of the same word. Transmission starts when the transmit buffer is written if a reception is not in progress, otherwise transmission starts automatically after the read operation is completed.

With regard to the receive mode, the clock output is the same as in the transmit mode except that if the read/write bit in the SI/O mode register is sampled as "read" at the completion of the transmit operation, the clock output is left running until the programmed number of bits has been shifted in.

Continuing to refer to FIG. 1 and specifically to the transmit length counter 8 therein, it may be noted that transmission takes place in sections of from 1 to 8 bits at a time. The number of bits in a section is programmed into the SI/O transmit length register prior to loading the transmit buffer. The length register does not need to be reprogrammed if successive sections have the same length.

Regarding the received word length counter, received words can be 8 or 16 bits in length. The desired length is programmed by software into the SI/O mode register.

Based upon what has been said heretofore above, it should be clear that software specifies the various interface formats and clock speeds in the SI/O mode register. It should also be clear that the received word length, i.e., 8 or 16 bits, and the edge that that data is received on are also programmed in this register.

Referring still further to FIG. 1, it may be seen that the serial port has a SI/O data out pin 10, a SI/O data in pin 12, and a SI/O clock out pin 14. The SI/O data out pin 10 is for the data output of the SI/O. In the actually constructed embodiment of the present invention, data is transmitted MSB first, on the falling edge of the clock. When the module is disabled, in shut-down, or when the IC is in reset, the pin is held low. The SI/O data in pin 12 is for data input for the SI/O. In the actually constructed embodiment of the present invention, data is programmably clocked in on either the rising or falling edge of the SI/O clock. The SI/O clock out pin 14 is for clock output for the SI/O. In the actually embodiment of the present invention, this is a gated clock that produces the correct number of transitions for the programmed operation. Thus, it is not free running. When the module is disabled, in shut-down, or when the IC is in reset, the pin is held low.

Referring further to FIG. 1, it may be seen that the serial port module contains some seven user visible registers. These registers include the serial port mode register 6, the SI/O transmit buffer 2, the SI/O receive buffer 4, the SI/O transmit length register 8, as well as an SI/O status register, an SI/O interrupt mask register, and an SI/O interrupt source register.

Figure 2A:
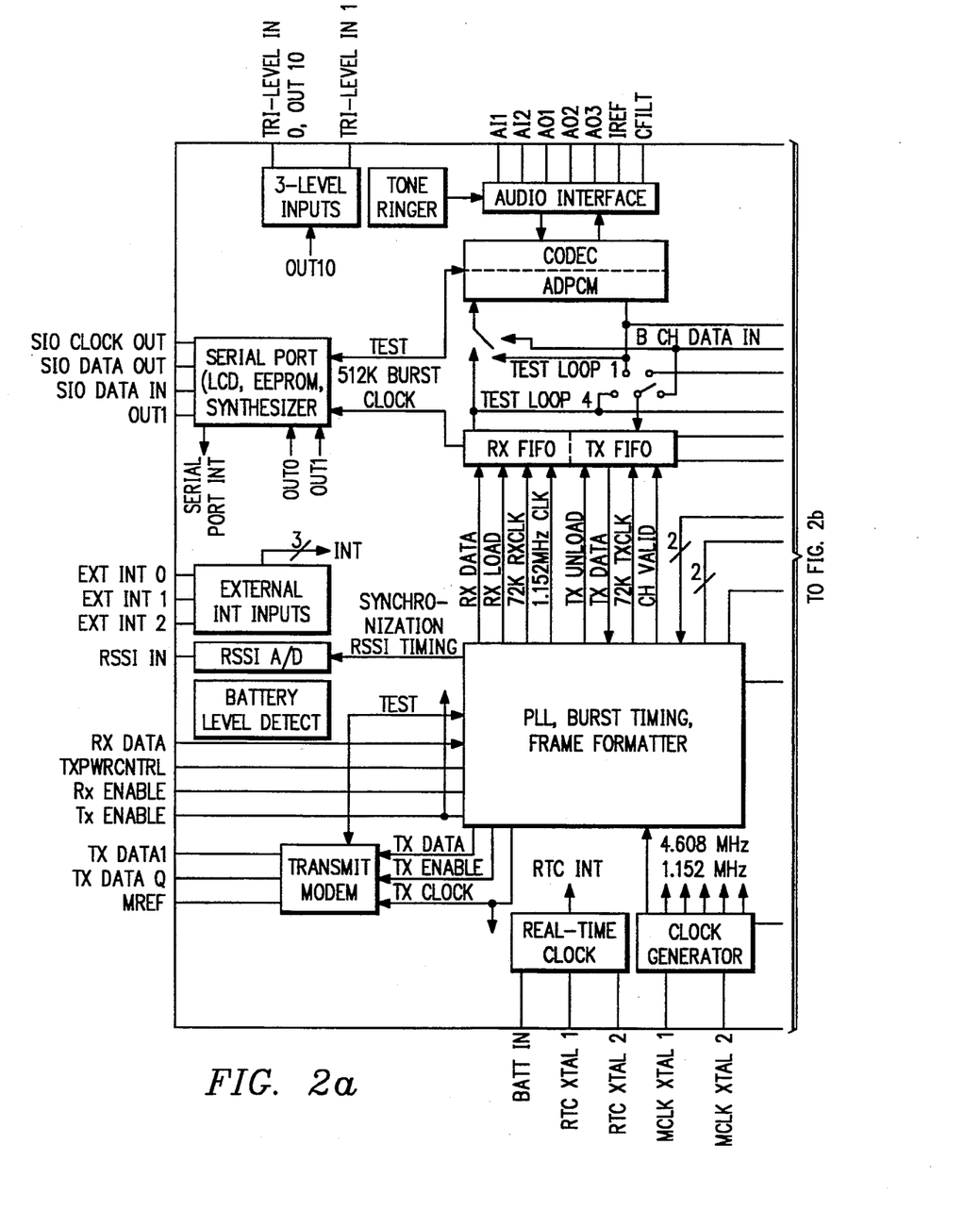
FIGS. 2a and 2b are a block diagram of an integrated circuit including the serial interface of FIG. 1.
Figure 2B:
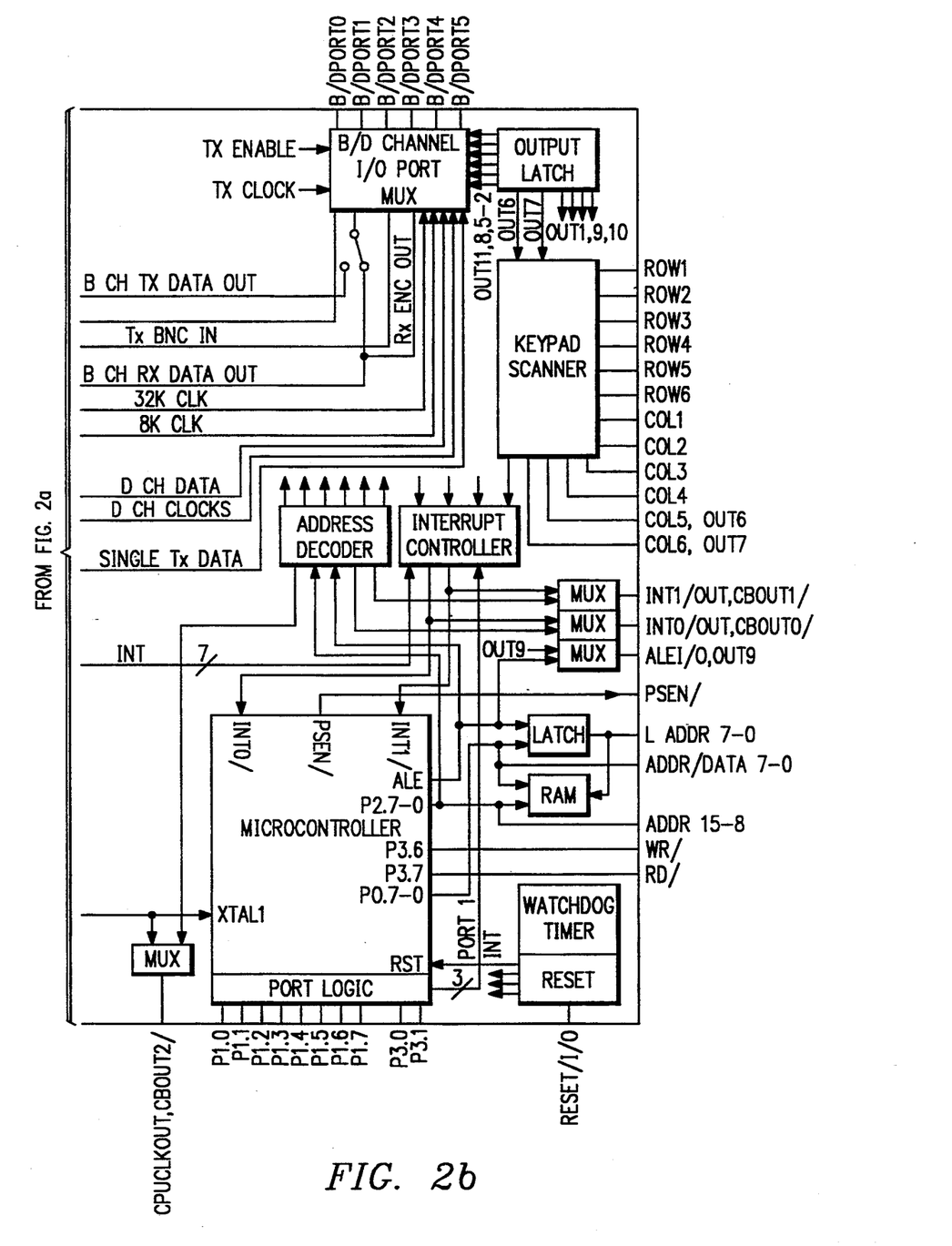

Referring now to FIG. 2, there is shown a block diagram of an integrated circuit (IC) including a serial port according to the teachings of the present invention. Because the IC shown in FIG. 2 is discussed at length in a case related hereto, and which has been incorporated by reference herein, the various elements shown in FIG. 2 will not be discussed in detail. However, it is useful for those skilled in the art to note how a serial port (shown as element 16 in FIG. 2) may be connected into an integrated circuit.

In FIG. 2, it may be seen that the serial port module 16 according to the present invention may be so incorporated into an IC that its SI/O clock out, SI/O data out, SI/O data in, and out 1 serve as an external interface to the IC. It may also be seen that the serial port module receives input from the IC in the form of an out 0 and an out 1 signal. Further, the serial port module according to the teachings of the present invention also receives a 512 k burst clock input signal. This is shown to come from the RX FIFO portion of the IC shown in FIG. 2.

The serial port module according to the teachings of the present invention and shown in FIG. 2 also may be seen to deliver an output to the IC in the form of the serial port interrupt.

Finally, a two-way test signal may be seen to interconnect a codec portion of the IC shown in FIG. 2 and the serial port according to the teachings of the present invention, also shown in FIG. 2.

Figure 3:
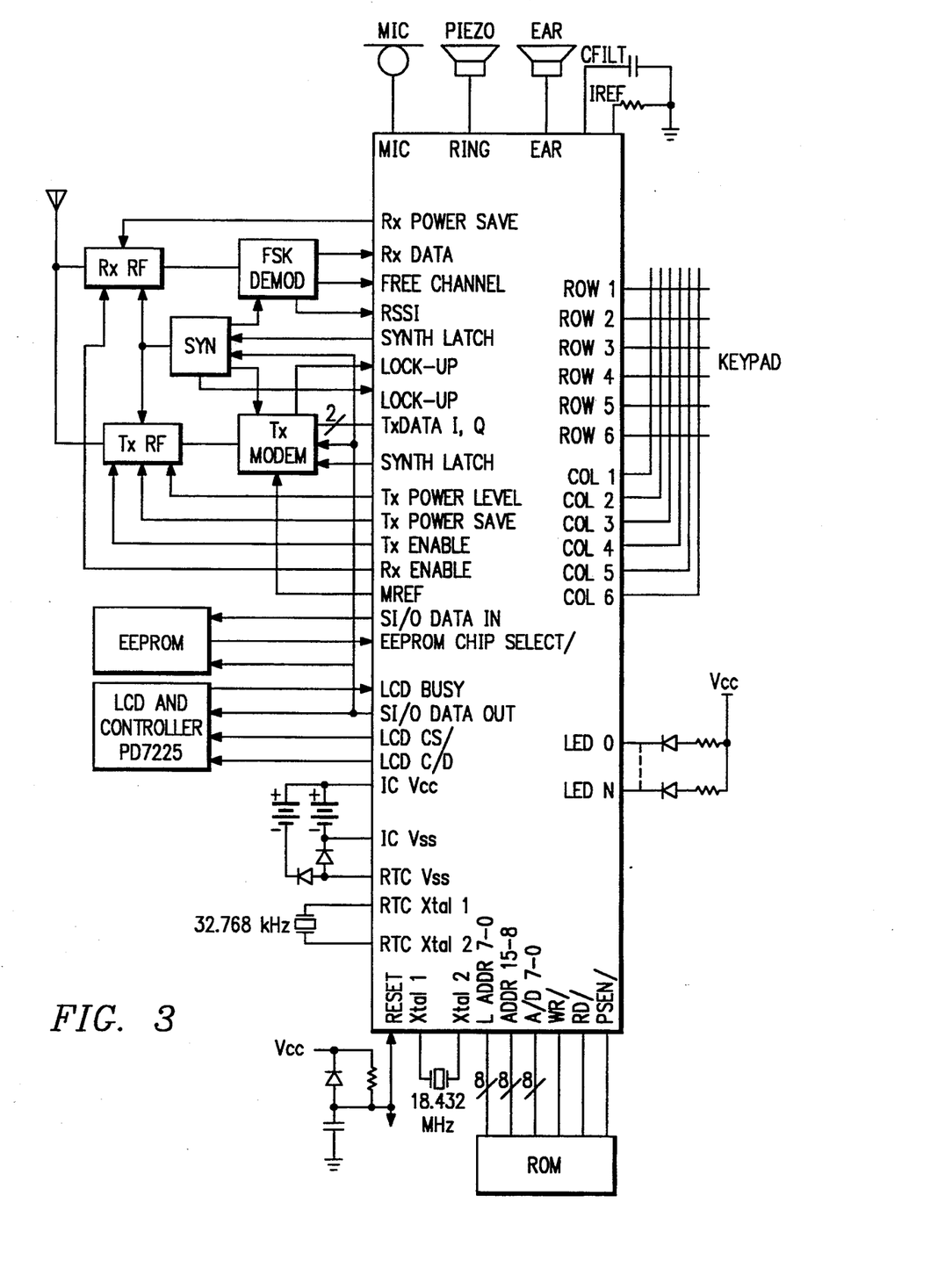
FIG. 3 is a block diagram of a cordless telephone terminal unit into which the integrated circuit of FIG. 2 is incorporated.
Figure 4:
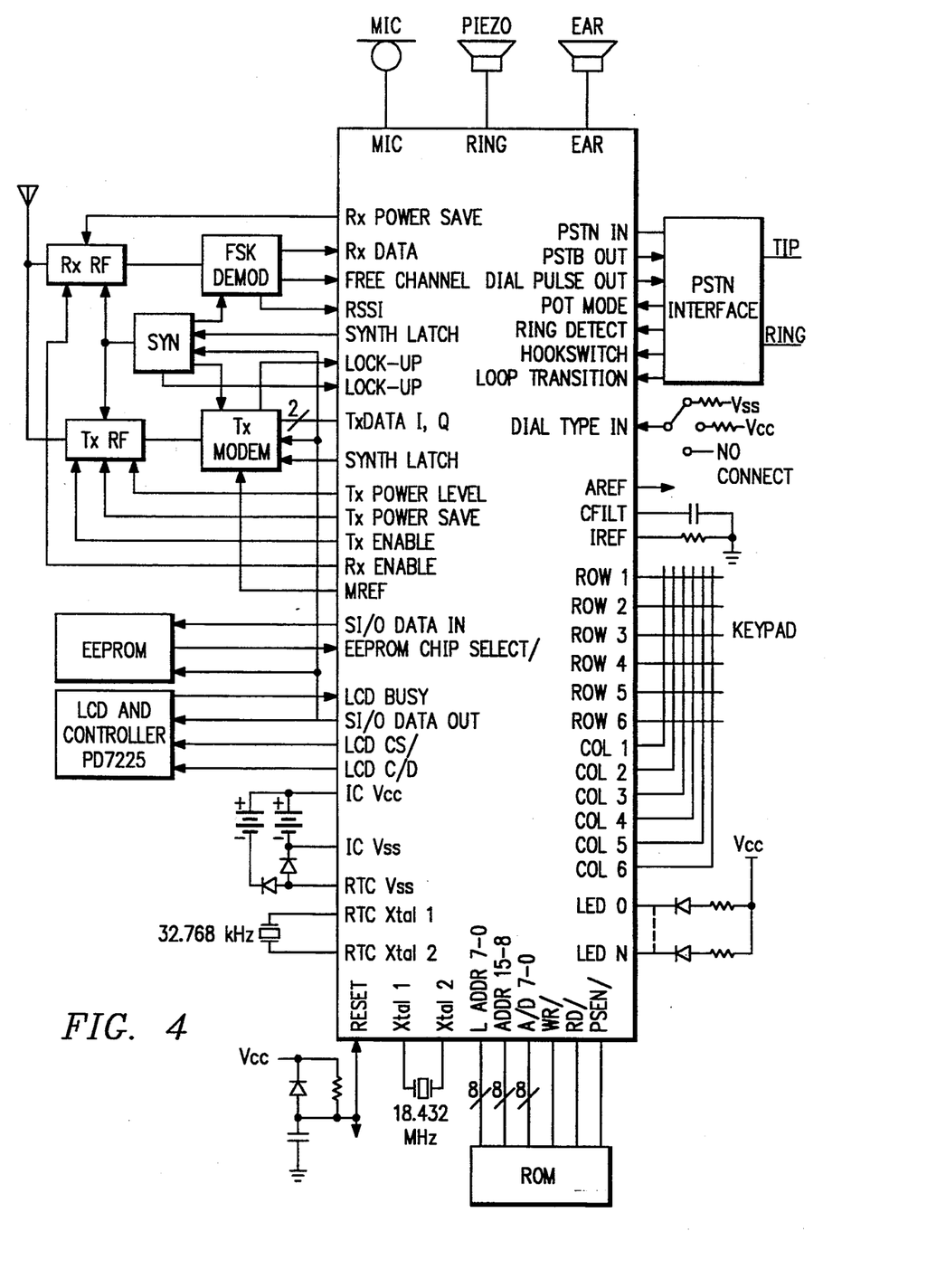
FIG. 4 is a block diagram of a cordless telephone base station into which the integrated circuit of FIG. 2 is incorporated.

Referring now to FIGS. 3 and 4, shown therein is a terminal or handset portion of a cordless telephone and a base station portion of a cordless telephone, respectively. In FIGS. 3 and 4 it may be seen that the IC shown in FIG. 2 plays a prominent role in both the terminal and base station portions of the cordless telephone depicted. It may also be seen in FIGS. 3 and 4 how the various input and output signals to the serial port module according to the teachings of the present invention interface with external elements to the IC within the cordless telephone.

Now, by way of example only, set forth below are details regarding the various user visible registers in the actually constructed embodiment of the present invention. The serial port mode register, SI/O transmit buffer, SI/O receive buffer, SI/O transmit length register, SI/O status register, serial port interrupt mask register, and serial port interrupt source register are each discussed below and depicted in FIGS. 5–11, respectively.

| Serial Port Mode Register | |
|---|---|
| Address: | FF30 |
| Size: | 3 bits |
| Default: | XXXXX000 |
| Access Mode: | Read/write |
| Set by: | Software |
| Cleared by: | Software, reset |

Figure 5:
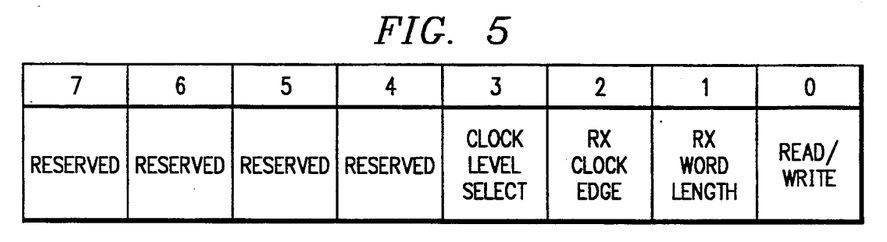
FIG. 5 is a block diagram of a serial port mode register that may be employed in embodiments of the present invention.

This register specifies for operating modes of the serial port module. Note that the SI/O enable and data rate control bits are located in the clock generator module. This register is depicted in FIG. 5.

| | |
|---|---|
| BITS 7-4 | Reserved--Write operations must write zeros. Reads return an indeterminate value. A read-modify-write operation can write back the read value. |
| BIT 3 | Clock Level Select--Used to select the state of the clock pin when the SI/O port is enabled and the clock is inactive. When the bit is set, the clock is held low. When the bit is cleared, the clock is held high. This facility adds flexibility insofar as it facilitates working with different parts. |
| BIT 2 | Receive Clock Edge Selection--When set, the data is received on the rising edge of the SI/O clock. When cleared, the data is received on the falling edge of the SI/O clock. |
| Bit 1 | Receive Length Selection--When set, 8-bit words are received. When cleared, 16-bit words are received. |
| Bit 0 | Read/Write Selection--This bit is sampled at the end of every transmit operation. If it is set, the hardware will keep the clock running and receive a word. If it is cleared, the clock will be stopped. Note that data can be transmitted with this bit in either state. (Data transmissions can not overlap reception.) |

| SI/O Transmit Buffer | |
|---|---|
| Address: | FF31 |
| Size: | 8 bits |
| Default: | Don't care |
| Access mode: | Write |
| Set by: | Software |
| Cleared by: | N.A. |

Figure 6:
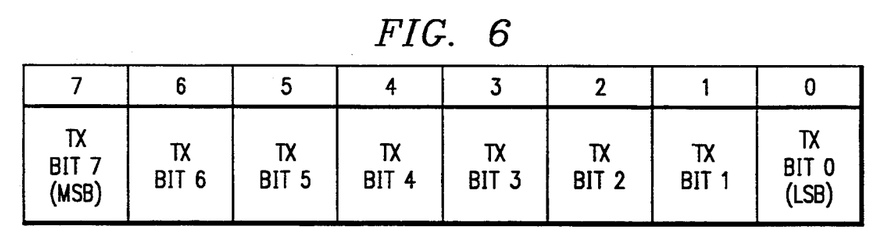
FIG. 6 is a block diagram of an SI/O transmit buffer that may be employed in embodiments of the present invention.

The SI/O interface transmit data register is depicted in FIG. 6.

| | |
|---|---|
| BITS 7-0 | Transmit Data--Data written into this register is transmitted MSB first (register bit 7 corresponds to bit 7 on the data bus). When a word length of less than 8 bits is programmed in the SI/O Transmit Length Register, the bits to be transmitted must be loaded into the least significant bit positions of this register. |

| SI/O Receive Buffer | |
|---|---|
| Address: | FF32 |
| Size: | 8 bits |
| Default: | Don't care |
| Access mode: | Read |
| Set by: | Hardware |
| Cleared by: | Software read |

Figure 7:
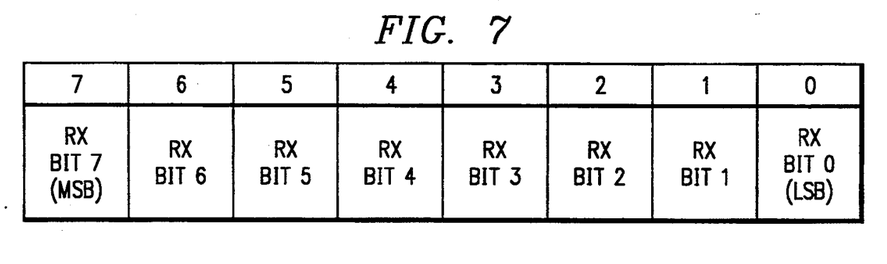
FIG. 7 is a block diagram of an SI/O receive buffer that may be employed in embodiments of the present invention.

The SI/O interface receive data register is depicted in FIG. 7.

| SI/O Transmit Length Register | |
|---|---|
| Address: | FF33 |
| Size: | 3 bits |
| Default: | XXXXX000 |
| Access mode: | Read/write |
| Set by: | Software |
| Cleared by: | Software, reset |

Figure 8:
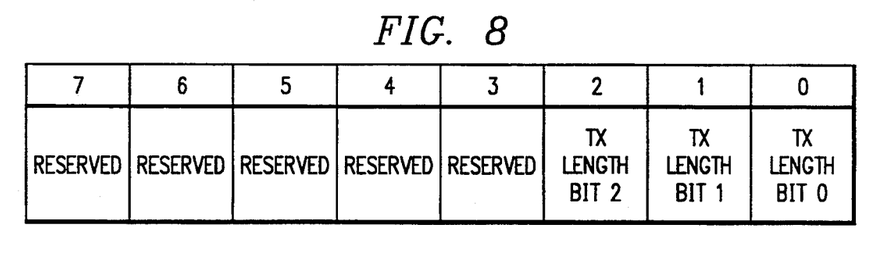
FIG. 8 is a block diagram of an SI/O transmit length register that may be employed in embodiments of the present invention.

This register, depicted in FIG. 8, specifies the length of the transmit word.

| | |
|---|---|
| BITS 7-3 | Reserved--Write operations must write zeros. Reads return an indeterminate value. A read-modify-write operation can write back the read value. |
| BITS 2-0 | Word Length--Software writes these bits with a code to specify the length of the word to be transmitted. If multiple words of the same length are to be transmitted, software does not need to re-write this register. |

| BITS 210 | WORD LENGTH |
|---|---|
| 000 | 8 |
| 001 | 1 |
| 010 | 2 |
| 011 | 3 |
| 100 | 4 |
| 101 | 5 |
| 110 | 6 |
| 111 | 7 |

| SI/O Status Register | |
|---|---|
| Address: | FF37 |
| Size: | 2 bits |
| Default: | 00 hex |
| Access mode: | Read |
| Set by: | Hardware |
| Cleared by: | Hardware, reset |

Figure 9:
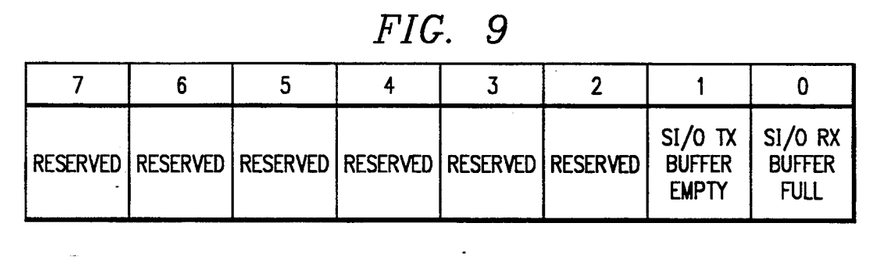
FIG. 9 is a block diagram of an SI/O status register that may be employed in embodiments of the present invention.

This register, depicted in FIG. 9, contains status bits for the SI/O interfaces.

| | |
|---|---|
| BITS 7-2 | Reserved--Reads return zeros for this revision of the IC. Future revisions of the IC could implement a function that would result in one or more of these bits being read as a one. Software should be written to take this into account. |
| BIT 1 | SI/O Transmit Buffer Empty--This bit is set whenever the SI/O transmit buffer is empty. It is cleared when data is present in the buffer. |
| BIT 0 | SI/O Receive Data Available--This bit is set when there is a full byte of data in the user accessible portion of the SI/O receive data register (double buffered). The bit is cleared when the user accessible portion of the buffer is empty and there is not a complete byte in the shift register portion of the buffer to be passed to the user accessible portion. |

| Serial Port Interrupt Mask Register |
|---|

-continued

| | |
|---|---|
| Address: | FF38 |
| Size: | 2 bits |
| Default: | XXXXXX00 |
| Access mode: | Read/write |
| Set by: | Software |
| Cleared by: | Software, reset |

Figure 10:
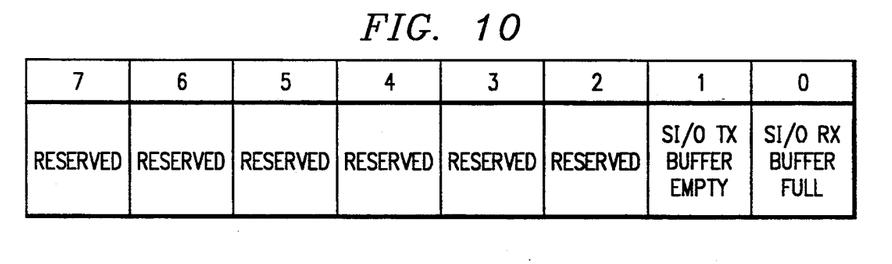
FIG. 10 is a block diagram of a serial port interrupt mask register that may be employed in embodiments of the present invention.

This register, depicted in FIG. 10, contains interrupt enable bits corresponding to the bits in the SI/O Status Register.

| | |
|---|---|
| BITS 7-2 | Reserved—Write operations must write zeros. Reads return an indeterminate value. A read-modify-write operation can write back the read value. |
| BIT 1 | SI/O Transmit Buffer Empty—When set, this interrupt is enabled. When cleared, the interrupt is masked. |
| BIT 0 | SI/O Receive Data Available—When set, this interrupt is enabled. When cleared, the interrupt is masked. |

Serial Port Interrupt Source Register

| | |
|---|---|
| Address: | FF39 |
| Size: | 2 bits |
| Default: | 00 hex |
| Access mode: | Read |
| Set by: | Hardware |
| Cleared by: | Hardware, reset |

Figure 11:
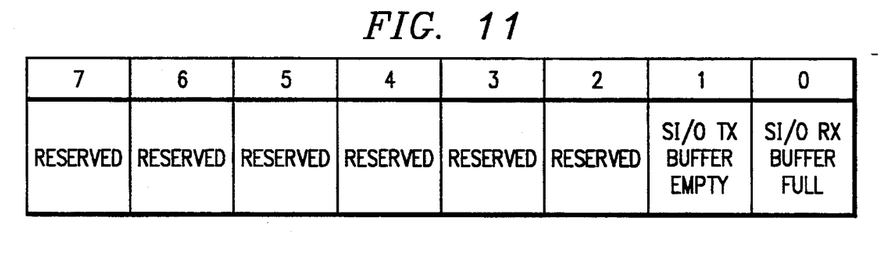
FIG. 11 is a block diagram of a serial port interrupt source register that may be employed in embodiments of the present invention.

This register, depicted in FIG. 11, reports the source of SI/O interrupt requests to the microcontroller. The descriptions of the bits assumes that the interrupts are not masked.

| | |
|---|---|
| BITS 7-2 | Reserved—Reads return zeros for this revision of the IC. Future revisions of the IC could implement a function that would result in one or more of these bits being read as a one. Software should be written to take this into account. |
| BIT 1 | SI/O Transmit Buffer Empty—This bit is set whenever the SI/O transmit buffer becomes empty. It is cleared when data is loaded into the buffer. Software should only enable this interrupt once data has been loaded into the shift register and there is another byte of data to transmit. |
| BIT 0 | SI/O Receive Data Available—This bit is set when a byte of data is transferred into the user accessible portion of the SI/O receive data register (double buffered). The bit is cleared when the user accessible portion of the buffer becomes empty and there is not a complete byte in the shift register portion of the buffer to be passed to the user accessible portion. |

Those skilled in the art should now fully understand and appreciate the structure, operation, and advantages of the present invention. In essence, the present invention provides a serial communication system including a serial communication port structure for starting and stopping an internal clock. The internal clock is designed, in operation, to generate a clock output signal to be transmitted to a device external to the system in which the serial communication port is incorporated. By ANDing the clock output signal with a data output signal of predetermined length, the serial communication port can effectively control the passage of time as sensed by the external device. Therefore, the present invention provides a simple, low-cost, and flexible serial interface, made primarily of hardware.

Obviously, numerous modifications and variations are possible in view of the teachings above. Accordingly, within the scope of the appended claims, the present invention may be practiced otherwise than as specifically described hereinabove.

What is claimed is:

1. A serial input/output port for a microcontroller, said serial input/output port operable to send data and clock signals to an external device, said serial input/output port comprising:
   means for determining a select number of data bits to send to said external device;
   means for producing only enough clock pulses to send said determined select number of data bits;
   means for beginning production of clock pulses to send said determined select number of data bits; and
   means for stopping production of clock pulses immediately upon production of only enough clock pulses to send said determined select number of data bits.

2. A serial input/output port as recited in claim 1, wherein said means for determining a select number of data bits to send to said external device comprises a transmit length counter.

3. A serial input/output port as recited in claim 2, wherein said means for producing only enough clock pulses to send said determined select number of data bits comprises a clock divider.

4. A serial input/output port as recited in claim 3 wherein said transmit length counter generates a control signal, wherein said clock divider generates a clock output signal, and wherein said means for producing only enough clock pulses to send said predetermined number of data bits further comprises means for ANDing said clock output signal with said control signal.

5. A serial input/output port module for a microcontroller, said serial input/output port operable to send data and clock signals to an external device, said serial input/output port module comprising:
   an internal clock;
   means for starting said internal clock;
   means for transmitting a predetermined number of data bits to said external device while said clock is running; and
   means for stopping said internal clock immediately upon completion of transmission of said predetermined number of bits.

6. A serial input/output port module as recited in claim 5, wherein said internal clock generates a clock signal during operation, and wherein said serial input/output module further comprises means for transmitting said clock signal to said external device.

7. A serial input/output port module as recited in claim 6, wherein said means for transmitting a predetermined number of data bits to said external device while said clock is running comprises a transmit length counter and a clock divider.

8. A serial input/output port module as recited in claim 7, wherein said transmit length counter generates a control signal, wherein said clock divider generates a clock output signal, and wherein said means for transmitting a predetermined number of data bits to said external device while said clock is running further comprises means for ANDing said clock output signal with said control signal. —

9. A method for transmitting data from a microcontroller to an external device over a serial input/output port, said method comprising the steps of:

sending a predetermined amount of said data simultaneously with a clock signal to said external device; and stopping said clock signal immediately upon transmission of said last of said predetermined amount of data.

10. A method as recited in claim 9, further comprising the step of determining whether to stop said clock signal high or low, and wherein said step of stopping said clock signal comprises the step of stopping said clock signal high or low, as determined during said step of determining, immediately upon transmission of said last of said predetermined amount of data.

11. A method as recited in claim 9, further comprising the step of counting said data to determine when said predetermined amount is transmitted, this step of counting producing a control signal.

12. A method as recited in claim 11, further comprising the step of generating a clock output signal.

13. A method as recited in claim 12, further comprising the step of ANDing said clock output signal with said control signal.

14. A serial input/output port for a microcontroller, said serial input/output port operable to receive data from an external device, said serial input/output port comprising:

means for determining a select number of data bits to receive from said external device;

means for producing only enough clock pulses to receive said determined select number of data bits;

means for beginning production of clock pulses to receive said determined select number of data bits; and means for stopping production of clock pulses immediately upon production of only enough clock pulses to receive said determined select number of data bits.

15. A serial input/output port as recited in claim 14, wherein said means for determining a select number of data bits to receive from said external device comprises a receive word length counter.

16. A serial input/output port as recited in claim 15, wherein said means for producing only enough clock pulses to receive said determined select number of data bits comprises a clock divider.

17. A serial input/output port for a microcontroller, said serial input/output port operable to send data and clock signals to an external device, and said serial input/output port also operable to receive data from an external device, said serial input/output port comprising:

means for determining a select number of data bits to send to said external device;

means for producing only enough clock pulses to send said determined select number of data bits;

means for beginning production of clock pulses to send said determined select number of data bits;

means for stopping production of clock pulses immediately upon production of only enough clock pulses to send said determined select number of data bits;

means for determining a select number of data bits to receive from said external device;

means for producing only enough clock pulses to receive said determined select number of data bits;

means for beginning production of clock pulses to receive said determined select number of data bits; and means for stopping production of clock pulses immediately upon production of only enough clock pulses to receive said determined select number of data bits.

18. A serial input/output port as recited in claim 17, further comprising means for determining whether to stop clock pulses high or low.

19. A serial input/output port as recited in claim 18, wherein said means for determining whether to stop clock pulses high or low comprises a bit in a serial port mode register.

* * * * *